United States Patent [19]

Paduch et al.

[11] 4,117,765
[45] Oct. 3, 1978

[54] POWER SERVO CONTROL

[75] Inventors: Stanley R. Paduch, Somers; Lawrence S. Smith, Simsbury, both of Conn.

[73] Assignee: Unites Technologies Corporation, Hartford, Conn.

[21] Appl. No.: 748,981

[22] Filed: Dec. 9, 1976

[51] Int. Cl.² .......................... F15B 9/03; F15B 9/09; F15B 13/16; F15B 15/17
[52] U.S. Cl. ...................................... 91/361; 91/387; 91/417 R
[58] Field of Search ..................... 91/387, 386, 363 R, 91/47, 363 A, 361, 417 R; 74/105

[56] References Cited

U.S. PATENT DOCUMENTS

| | | | |
|---|---|---|---|
| 1,564,688 | 12/1925 | Kimball | 91/387 |
| 2,789,543 | 4/1957 | Papowsky | 91/387 |
| 2,968,283 | 1/1961 | Hilker et al. | 91/387 |
| 3,125,856 | 3/1964 | Bronson et al. | 91/363 R |
| 3,390,613 | 7/1968 | Westbury et al. | 91/363 R |
| 3,464,318 | 9/1969 | Thayer et al. | 91/363 R |

FOREIGN PATENT DOCUMENTS 1,131,854  10/1968  United Kingdom .................. 91/363 A Primary Examiner—Paul E. Maslousky
Attorney, Agent, or Firm—Charles A. Warren

[57] ABSTRACT

An electrohydraulic servo system to actuate the power shaft of a fuel control system from the cockpit throttle including electrical devices responsive to the position of the throttle that actuates a hydraulic piston for moving the power shaft together with a backup system that assures a shaft position proportional to the throttle position. This permits the use of electrical lines from the cockpit to the engine rather than mechanical cables and linkages.

7 Claims, 1 Drawing Figure

U.S. Patent  Oct. 3, 1978  4,117,765
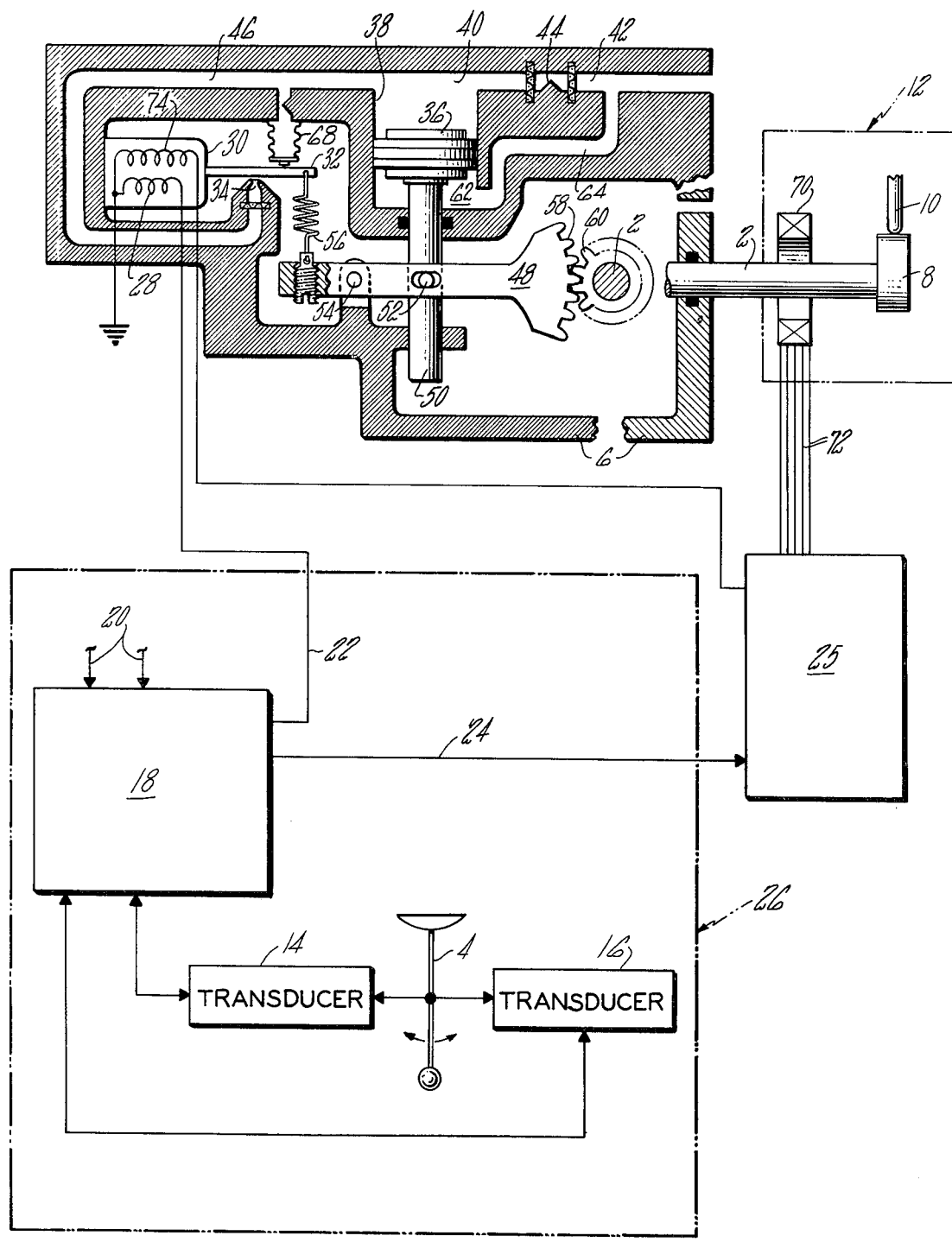

POWER SERVO CONTROL

BACKGROUND OF THE INVENTION

Present mechanical systems for actuating the fuel control from the cockpit throttle have inherent inaccuracies from linkage backlash, temperature effects, and aircraft structure deflections. These inaccuracies result in individual cockpit throttle adjustments on multi-engine installations to maintain a uniform thrust distribution during various flight modes and conditions. A system to replace the power lever cables and linkages with electrical cables would avoid these problems.

SUMMARY OF THE INVENTION

One feature of the present invention is an electrohydraulic system that will provide a highly accurate adjustment of the power lever shaft in response to throttle adjustment, in which the electrical devices associated with the cockpit throttle may be connected to the electrohydraulic system associated with the control at the engine only by electrical cables. The proposed system employs an electrical feedback of actual power lever shaft position through the supervisory electronic control to result in a highly accurate primary system. Another feature is a backup system that overcomes the dispatch reliability shortcomings of an electronic control system.

According to the invention, the cockpit throttle has electrical devices that sense a throttle displacement and provide an electrical signal proportional to the throttle movement, which signal is transmitted by electrical cable to the power lever shaft actuator and the electronic supervisory control. The actuator is an electrohydraulic device that, in response to the electrical signal, energizes a hydraulic mechanism to cause turning of the shaft an amount proportional to the throttle movement. This movement is fed back electrically to the electronic supervisory control to compare the desired turning movement of the shaft with the actual turning movement.

The foregoing and other objects, features, and advantages of the present invention will become more apparent in the light of the following detailed description of preferred embodiments thereof as illustrated in the accompanying drawing.

BRIEF DESCRIPTION OF THE DRAWING

The single FIGURE is a view partly in section and partly diagrammatic of the device.

DESCRIPTION OF THE PREFERRED EMBODIMENT

The device is arranged to cause a predetermined turning movement of the fuel control shaft 2 when the cockpit throttle 4 is moved through a predetermined angle. The shaft 2 is shown in two positions in the drawing, one position being at right angles to the other and to emphasize this the box 6 for the electrohydromatic device is shown as broken away in the area in which the shaft 2 is journaled.

The shaft 2 carries a cam 8 that engages a follower 10 forming part of the computer mechanism of the fuel control, this mechanism serving to control the fuel quantity based on the angular position of the cam. The fuel control is represented by the box 12 and may be any of several known controls. For the purpose of this invention, the fuel control has the projecting shaft 2, which for controlling fuel supply to the engine is turned in proportion to the movement of the throttle.

The primary system of the invention includes two throttle transducers 14 and 16 in juxtaposition to the throttle lever 4 and connected thereto so that proportional displacement of the transducers by displacement of the throttle will result in two signals, one from each transducer to a box 18 which utilizes aircraft D.C. power represented by the leads 20 to produce two equal amplified signals, also proportionate to throttle movement. One signal is conducted by lead 22 to the electrohydraulic device 6. The other signal is conducted by lead 24 to the existing supervisory control 25, located normally adjacent to the fuel control at the engine. The device 6 is also necessarily at the fuel control and the only connections from the cockpit, represented diagrammatically by the panel 26, are the two leads 22 and 24. No mechanical connections are necessary from the throttle and associated mechanism to the electrohydraulic system or the supervisory control.

The signal from box 18 to the device 6 energizes one coil 28 of a torque motor 30. This results in an unbalance on the torque motor arm 32, displacing it toward or away from a nozzle 34 depending on the direction of movement of the throttle. The change in nozzle area produces an unbalance on a hydraulic piston 36 in a cylinder 38. The space 40 above the piston in the cylinder is supplied by fluid through a passage 42 having a fixed constriction 44 therein. The nozzle is also connected to the space 40 by a passage 46.

As the arm 32 moves relative to the nozzle, the resulting change in the rate of flow to or from the space 40 above the piston produces a hydraulic unbalance on the piston resulting in piston displacement and a corresponding movement of the lever 48 to which the piston rod 50 is connected as by a pin 52. This lever is pivoted on a fixed pin 54, and the end of the lever is connected by a feedback spring 56 to the end of the torque motor arm 32. As the piston is moved with a resulting movement of the lever, the changing load on the spring restores the force balance on the torque motor arm and thus the piston displacement is proportional to the signal to the torque motor and thus proportional to throttle movement.

The displacement of the piston is transmitted to the fuel control shaft by a gear segment 58 on the end of the lever 48 remote from the spring 56. This segment engages a gear 60 on the fuel control shaft 2. The result is angular movement of the shaft proportional to throttle lever movement.

The space 62 beneath piston 36 is connected to the fluid passage 42 upstream of the constriction 44 by a passage 64. This space 62 is thus supplied by the constant pressure source for passage 42. In the absence of friction, gear backlash, tolerances, and the like, the actual control shaft position is accurately maintained relative to the desired position.

The second signal, that is, from the box 18 to the supervisory control 25, serves to trim actual control shaft position for errors introduced by sources such as those above mentioned. Actual shaft position is transmitted by a signal from a resolver transducer 70 surrounding shaft 2, by leads 72 to the supervisory control where it is compared to the throttle transducer signal from the blackbox 18. Any error between the signals is used to generate a proportional signal to a second torque motor coil 74, producing a force unbalance on the torque motor arm 32 until the shaft position error is reduced effectively to zero.

In the event of an electrical failure in the supervisory control, the control shaft position will then be proportional to the electrical signal from box 18.

In order to enhance the performance of this system a bellows 68, connected to passage 46, is positioned to engage the torque motor arm or nozzle flapper 32 to provide a negative spring rate for the nozzle flapper displacement system. This bellows is sized to reduce the total system spring rate approximately to zero for steady state conditions. This serves to reduce the error in the signal to the torque motor required to overcome friction in the system.

The supervisory control is equipped with failure detection circuitry that is designed to assume any system anomaly as a control failure and will reduce the signal from this control to the torque motor to zero, leaving the system under the control of the signal from box 18 directly to the torque motor. It will be understood that the supervisory control itself is not a part of this invention; its purpose in this invention is to measure the displacement of the power shaft by the use of the existing control and deliver an error signal to the torque motor.

Although the invention has been shown and described with respect to a preferred embodiment thereof, it should be understood by those skilled in the art that other various changes and omissions in the form and detail thereof may be made therein without departing from the spirit and the scope of the invention.

Having thus described a typical embodiment of our invention, that which we claim as new and desire to secure by Letters Patent of the United States is:

1. An electrohydraulic servo system comprising:
    transducer means including a plurality of transducers associated with and responsive to displacement of a lever to produce a signal proportional to the displacement,
    a torque motor actuated by said signal,
    hydraulic means including a piston connected to a shaft and controlled by said torque motor to turn said shaft an amount proportional to the lever displacement,
    a gear on said shaft,
    an additional lever having a gear segment in mesh with said gear and connected to said piston to be moved thereby, and
    a feedback mechanism interconnecting the lever to the torque motor to apply a balancing force on the motor proportional to turning of the shaft.

2. A servo system as in claim 1 including:
    a nozzle for the flow of fluid through the hydraulic means,
    an arm on the torque motor that cooperates with the nozzle and by its movement adjusts flow through the nozzle, the feedback mechanism including a connection from the additional lever to said arm to apply the balancing force.

3. An electrohydraulic servo system comprising:
    electrical means associated with a first movable lever to generate an electrical signal proportional to displacement of the lever,
    hydraulic means associated with a shaft for adjusting said shaft, said hydraulic means including a piston,
    a second lever having a gear segment thereon and connected to the piston to be moved thereby,
    a gear on the shaft engaged by said gear segment,
    a torque motor responsive to the signal from said electrical means for actuating said hydraulic means to move the shaft through said second lever an amount proportional to displacement of the first lever, and
    feedback means including a connection between the second lever and said torque motor to apply a balancing force on the motor as the second lever is moved by said hydraulic means.

4. A servo system as in claim 3 including:
    an actuating arm on the torque motor,
    a nozzle in the hydraulic means through which fluid from said means flows, said arm being in a position to control the flow through the nozzle, the feedback mechanism including a spring connection between the second lever and said arm for applying the balancing force to said arm.

5. An electrohydraulic servo system comprising:
    transducer means associated with a first lever to generate a signal proportional to lever displacement,
    a torque motor actuated by said signal, said motor having a movable arm thereon,
    a hydraulic means including a piston and controlled by said torque motor,
    a second lever connected to said piston and having a gear connection with a control shaft, said hydraulic means being so controlled as to move the shaft an amount proportional to the displacement of said first lever,
    a nozzle through which the fluid for said hydraulic means passes, said movable arm being positioned with respect to the nozzle to control the flow therethrough, thereby to adjust the pressure acting on said piston, and
    a connection from said second lever to said movable arm to load the arm as a function of said second lever movement.

6. A servo system as in claim 5 including a pressure sensing bellows sensing the pressure on the piston and acting on said arm to provide a negative spring rate on said arm.

7. A servo system as in claim 5 including:
    means for sensing the movement of the shaft by an electrical signal,
    means for comparing this signal to the signal from the transducer means,
    means for actuating the torque motor in response to an error signal indicated by said comparing means, and
    said torque motor having two coils one responsive to the transducer signal and the other to the error signal.